UNITED STATES PATENT OFFICE 2,386,793

ORGANIC POLYSILICON ESTERS

William E. Hanford, Wilmington, Del., assignor to E. I. du Pont de Nemours & Company, Wilmington, Del., a corporation of Delaware No Drawing. Application June 6, 1940,
Serial No. 339,178

12 Claims. (Cl. 260—2)

This invention relates to new polymeric products, and more particularly to new polymeric silicon compounds. Still more particularly the invention relates to polysilicon esters and linear polysilicon esters.

There previously have been no known examples of polysilicon esters wherein silicon is linked to carbon atoms and wherein an organic group forms an integral part of the polymer chain. It therefore is an object of this invention to provide polysilicon esters of the said type, and to provide a process for their preparation.

The said object is accomplished, according to the invention, by reacting a polyhydric alcohol or a polyhydric phenol with a dihydrocarbondihydroxysilicane or ester-forming derivative thereof until a resinous product is obtained.

The term "resinous product" is used herein as including viscous oils.

The following detailed description of the invention and the examples hereinafter contained are intended to illustrate preferred embodiments of the invention and in no way to limit or restrict the same.

The polysilicon esters of the invention may be prepared by reacting a polyhydric compound of the class consisting of polyhydric alcohols and polyphenols, preferably a glycol, with either (a) a dihydrocarbondihalosilicane, $R_2SiX_2$, or (b) a silicon ester of the type $R_2Si(OR')_2$, where R' is a hydrocarbon radical, and R is a monovalent organic radical which is free of reactive hydrogen and which contains a carbon atom linked to the silicon atom in said formula. Preferably R is a hydrocarbon radical. If a polyhydric compound containing more than two hydroxyl groups is employed the polysilicon ester will not necessarily be linear, i. e., 2-dimensional. Whether a linear or 3-dimensional polyester is obtained, will depend upon the extent of the reaction; on prolonged reaction a 3-dimensional polymer will result. When dihydric compounds are used the polymers are linear. In both cases (a) and (b) the reaction is carried out by heating approximately chemically equivalent amounts of the reactants, but in case (b) the presence of a catalyst generally is required, and the alcohol produced as a by-product is removed from the reaction mixture, as by distillation, during the course of the ester interchange which takes place. By "chemically equivalent amounts" is meant that one mol of the organic silicon compound is used for each mol of dihydroxy compound, or for each ⅔ mol of trihydroxy compound, or for each ½ mol of tetrahydroxy compound, etc.

When the invention is practiced in accordance with method (a) the dihydrocarbondihalosilicane may be prepared by reacting silicon tetrachloride with a Grignard reagent, such as RMgCl.

When the invention is practiced in accordance with method (b) the silicon ester of the type $R_2Si(OR')_2$ may be prepared by reacting the corresponding silicon halide $R_2SiCl_2$, with the corresponding hydroxy compound R'OH (Gruttner & Cauer, Ber. 51, 1291 (1918)), or by a process which, so far as I am aware, is new; viz., by reacting a silicon ester halide of the type $$(R'O)_2SiCl_2$$

with a metallo-organic compound. This novel reaction is based on the relative reactivities of the two linkages, Si—O and Si—Cl. It is known that both links are subject to fission by organo-metallic compounds but that the silicon-oxygen bond is somewhat less readily broken. Thus, from silicon tetrachloride, by the use of the Grignard reagent, tetrahydrocarbonsilicanes can be prepared; but from tetraethyl silicate and the organomagnesium compound only ortho esters of the silico acids $(RSi(OR)_3)$ can be prepared. By proper choice of the metallo-organic compound and the silicon ester halide, it has been found to be possible to prepare, e. g., the compound diethyldiphenoxysilicane, $(C_2H_5)_2Si(OC_6H_5)_2$, although in other cases, for example, in the reaction of phenyl lithium with diphenoxydichlorosilicane, the selectivity is lost, and all groups are replaced by the phenyl group, giving tetraphenyl-silicane.

The following examples will illustrate the scope of the invention in detail, without, however, being intended to limit or restrict it in any way. In all examples, the parts are by weight unless otherwise specified.

Example I

In a reactor equipped with a stirrer and a gas vent are placed 27.9 parts of dibenzyldichlorosilicane (B. P. 172–173° C./8 mm., prepared from silicon tetrachloride and benzyl magnesium chloride) and 22.8 parts of diphenylolpropane. The reaction mass is heated with stirring for three hours at a temperature sufficiently high to give a homogeneous molten mass. Evolution of hydrogen chloride occurs and the reaction mass darkens. At the end of three hours heating there is no further evolution of hydrogen chloride. The product is a dark polymeric product which sets up to a thick oil on cooling. The product is soluble in benzene.

Example II

The dibenzyldiphenoxysilicane used in this example was prepared as follows. In a reactor equipped with a stirrer, a reflux condenser, and a dropping funnel is placed 140 parts of phenol. To this is added 135 parts of dibenzyldichlorosilicane through the dropping funnel. The time required for the addition of the dichloride is about two hours. At the end of this time the reaction mixture is heated at 200° C. until the evolution of HCl has stopped. This requires about four hours. The resulting mixture is then fractionated and the fraction boiling 215–35/1 mm. is separated and refractionated. From this is obtained 108 parts (50 per cent yield) of dibenzyldiphenoxysilicane, $(C_6H_5CH_2)_2Si(OC_6H_5)_2$, boiling 230–1° at 1 mm. Analysis: Calc'd for $C_{26}H_{24}O_2Si$: Si, 7.07, found: Si, 7.03, $N_D^{25}$ 1.5922, $D_4^{25}$ 1.1164.

In a reactor equipped with a fractionating column is placed 19.827 parts of dibenzyldiphenoxysilicane and 11.414 parts of diphenylolpropane. To this mixture is added 0.01 parts of sodium. The fractionating column is attached to the reactor. The reactor is heated at 155–160° C. for three hours under a vacuum of 1 mm. At the end of this time 9.7 parts of phenol has collected in the receiver. The product obtained in this manner after removal from the flask is a solid having a slight pink color and a melting point of 35–40 C. The polymer can be drawn into filaments and is subject to only very slight hydrolysis and hazing in contact with water. The polymer has a hardness of 2 on the Moh scale and is soluble in benzene.

Example III

In a reactor equipped with a fractionating column is placed 19.826 parts of dibenzyldiphenoxysilicane, 5.910 parts of hexamethylene glycol, and 0.01 part of sodium. The fractionating column is attached to the reactor and the reactor is heated in an oil bath at 110–120° C. under a vacuum of 10 mm. for 2 hours. The heat is then increased to 135° C. and at this temperature phenol distills slowly out of the reaction mixture. After two hours, the temperature of the bath is increased to 210° C. and held there for four hours. At the end of this time there is no further evidence of phenol distilling out. The residue is a light brown viscous oil which is soluble in organic solvents, such as acetone and benzene.

Example IV

In a reactor having one opening to which a fractionating column can be attached is placed 20.026 parts of dibenzyldiphenoxysilicane, 9.400 parts of 4,4'-dihydroxydiphenyl, and 0.01 part of sodium. With the fractionating column attached, the reactor is heated at 200° C. for ½ hour and then at 230–240° C. until solution is complete, and held there for two hours. At the end of this time a vacuum of 10 mm. is applied and a distillate of phenol is collected. The vacuum is then removed and the heating at atmospheric pressure is continued for another period after which the vacuum is again applied and an additional distillate is removed. On cooling the residue is an opaque, sticky resin soluble in acetone and benzene.

Example V

In a reactor equipped with a fractionating column is placed 19.826 parts of dibenzyldiphenoxysilicane, 8.714 parts of decamethylene glycol and 0.01 part of sodium. The reactor is heated to 200° C. under atmospheric pressure, cooled and reheated to 150° C. under a vacuum of 15 mm. A distillate of phenol is removed through the fractionating column leaving a brown viscous oil. This oil is placed in a molecular still and heated under 1 mm. pressure at 110–150° C. to remove an additional quantity of phenol. The product is a viscous oil, soluble in acetone and in benzene.

Example VI

In a reactor fitted with a fractionating column is placed 17.827 parts of dibenzyldibutoxysilicane, (B. P. 206–207° C./10 mm., prepared in a manner analogous to that described for dibenzyldiphenoxysilicane in Example II), 5.908 parts of hexamethylene glycol, and 0.005 part of sodium. The mixture is heated slowly up to 200° C. and the butyl alcohol formed in the reaction is removed through the fractionating column. After the theoretical amount of butanol is distilled out, a vacuum of 17 mm. is applied to the reactor for a period of 2 hours. The product is a viscous, brown liquid which is soluble in acetone and in benzene.

Example VII

The diethyldiphenoxysilicane used in this example was prepared as follows. A Grignard reagent is prepared from 127.5 parts of ethyl bromide and 28 parts of magnesium. This reagent is then transferred under dry oxygen-free nitrogen to a reactor containing 151 parts of diphenoxydichlorosilicane in 100 parts of dry ether. This solution is cooled during the addition, which continues over approximately one hour. The solution is stirred for 20 hours and filtered to separate the solid. The solid is washed with ether and the ether removed from the combined filtrates. The residue is subjected to fractionation. The yield of diethyldiphenoxysilicane, B. P. 150–2° C. at 4–5 mm. is 25.2 parts or 20 per cent of the theoretical. Analysis: Calc'd for $C_{16}H_{20}O_2Si$: Si, 10.27. Found: Si, 10.01, 10.19, $N_D^{25}$ 1.5243.

In a reactor to which is attached a fractionating column is placed 13.611 parts of diethyldiphenoxysilicane, 11.414 parts of diphenylolpropane, and 0.01 part of sodium. This mixture is heated at 155° C. for 2 hours under 15–20 mm. vacuum and the phenol which is formed in the reaction distills out and is collected. The heating is continued at 155° C. and 5 mm. for 2 hours longer. The polymer which is thus obtained is a sticky semisolid at room temperature and is soluble in benzene.

Although the invention is not limited to linear (2-dimensional) polyesters, such polymers usually are preferred, because they can be dissolved and applied in this form as coating compositions, impregnating agents, and adhesives. Moreover, the highly polymeric linear polyesters can be spun into filaments and formed into films.

In the production of the linear polyesters, the polyhydric alcohol or diphenol employed will have the formula HO—R''—OH, in which R'' is a non-reactive bivalent organic radical. In general, R'' will be a hydrocarbon radical, such as hexamethylene in Examples III and VI, decamethylene in Example V, 4,4' diphenylene in Example IV, isopropylidene-diphenylene or 2-dimethyl-1,3-diphenylene, as in Examples I, II, and VII; or, in general, any alkylene, arylene, or alkarylene group. R'' also may be alicyclic, or it may contain a heteroatom such as oxygen or sulfur. For example, R″ may be cyclohexylene or 3-oxapentamethylene (from diethyleneglycol).

As examples of other polyhydric alcohols which can be used in the process of the invention may be mentioned glycerol, sorbitol and polyvinyl alcohol.

The silicon containing component of the polymer may be a dihydrocarbon dihydroxysilicane ($R_2Si(OH)_2$) or any ester-forming derivative of the dihydrocarbondihydroxysilicane; including, as well as the dihydroxysilicane, any dihydrocarbon ester of the dihydrocarbondihydroxysilicane, or any dihydrocarbondihalosilicane. In these types of compounds, $R_2Si(OH)_2$, $R_2Si(OR')_2$ and $R_2SiX_2$, the R and R' may be aryl, alkyl, or alkaryl hydrocarbon radicals, or any mixture of these groups. For instance, the radicals may be ethyl, propyl, amyl, isoamyl, allyl, phenyl, tolyl, xylyl, or benzyl. However, R may contain ether or other non-reactive groups; for example, R may be ethoxypropyl or phenoxyethyl. The X in $R_2SiX_2$ may be any halogen atom.

The catalyst used to promote the ester interchange reaction according to method (b) need not necessarily be sodium, as given in Examples II–VII. Any catalysts appropriate for increasing the rate of esterification may be employed, as, for example, alkali metals such as lithium, sodium, potassium, rubidium and cesium, or alkali metal alkoxides such as sodium ethoxide and potassium butoxide. Ordinarily, sodium is preferred, however. The amount of catalyst to be used is not necessarily limited to that indicated in the foregoing examples. It may vary from 0.002 per cent of the polymer weight, as in Example V, to a few percent, although it is seldom advantageous to use more than 1 per cent.

The temperature ranges indicated in the examples, although generally the most desirable, are not intended to be limiting. In general, any temperature which will produce a homogeneous melt of the reaction mass and which will permit convenient removal of the by-products of the reaction without removal of the reactants themselves, will be adequate. The most usual range of permissible temperatures will be between 50° C. and 300° C., with 150 to 250° C. as the preferred range.

It is to be understood that although the by-products are removed from the reaction mixture in the above examples by distillation, any suitable means may be used for this purpose. Thus, sublimation or selective extraction by means of a suitable solvent may be employed.

The time of reaction is determined by the degree of polymerization desired, and need not necessarily accord with the times given in the respective examples. The removal of a substantially theoretical amount of by-product will determine the time limit for the reaction in most cases. To obtain polymers of higher molecular weight, e. g., fiber-forming products, it is desirable to subject the polymer itself to longer periods of heating under reduced pressure.

Although the silicon-carbon bond undoubtedly is the strongest link known, as between silicon and other atoms, such as oxygen, sulfur, or nitrogen, the problem of preparing linear silicon polymers containing carbon-silicon links was fraught with a great deal of difficulty, by reason of the fact that the only methods available for the production of the necessary intermediates containing the silicon-carbon links involved the use of reactants which eliminated the possibility of having any functional groups in the resultant intermediate, to serve as a basis for the subsequent polymerization reaction. The present invention made use, however, of the discovery that the silicon to oxygen bond could be employed in the preparation of the polymers, through the expedient of utilizing dihydroxydihydrocarbonsilicanes or their ester-forming derivatives in the reactions. These compounds are prepared by reactions which are carefully chosen, in order that they shall have functional groups in the molecule which can be used in the later polymerization reaction. The linear polyesters of this invention contain recurring structural units of the formula

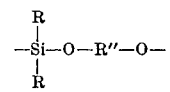

wherein the carbon-silicon linkages are represented by R—Si—R and wherein R″ represents the organic radical forming an integral part of the polymer chain.

The products of this invention are of especial value in situations where low melting, hard polymers, or semiliquid polymers, are desired—as for adhesive or binding purposes. The products also are of utility as ingredients in coating and molding compositions.

Since many apparently widely different embodiments of this invention may be made without departing from the spirit and scope thereof, it is to be understood that I do not limit myself to the specific embodiments thereof except as defined in the appended claims.

I claim:

1. In the manufacture of polymeric materials, the step which comprises heating at reaction temperatures a polyhydric organic compound of the formula $R''(OH)_x$ where R″ is a hydrocarbon radical and $x$ is a positive integer equal to at least two, with approximately chemically equivalent amounts of a dihydrocarbon silicon compound of the formula

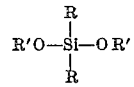

in which R and R' are hydrocarbon radicals.

2. The process of claim 1 in which the said dihydric compound is a glycol.

3. The process of claim 1 in which the said dihydric compound is a diphenol.

4. In the manufacture of linear polymeric materials, the steps which comprise heating at reaction temperatures, under conditions permitting the escape of volatile reaction products, in the presence of an esterification catalyst, a dihydric alcohol and approximately equimolecular proportions of a dihydrocarbon silicon compound of formula

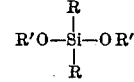

in which R and R' are hydrocarbon radicals, and continuing such heating until substantially no more volatile product is formed.

5. A process which comprises heating at ester-forming temperatures, and between 50–300° C., a mixture comprising a dihydric compound of the formula HO—R″—OH and approximately equimolecular proportions of a dihydrocarbon silicon compound of the formula—

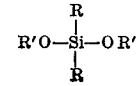

in which R, R' and R'' are hydrocarbon radicals, and continuing the heating with removal of the by-product of reaction, until a resinous product is formed.

6. The process of forming a polymeric product, which consists in subjecting a mixture of substantially equimolecular proportions of a dihydric alcohol and a dihydrocarbon silicon compound of the formula

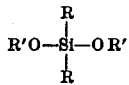

in which R and R' are hydrocarbon radicals to a temperature of 150 to 250° C., and continuing the process until a resinous mass is obtained.

7. A polysilicon ester substantially identical with that obtained by heating at reaction temperatures a polyhydric organic compound of the formula R''(OH)$_x$ where R'' is a hydrocarbon radical and $x$ is a positive integer equal to at least two, with approximately chemically equivalent amounts of a dihydrocarbon silicon compound of the formula

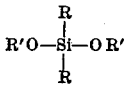

in which R and R' are hydrocarbon radicals.

8. A process for the production of linear polysilicon esters having recurring structural units of the general formula

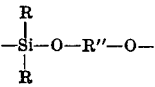

which comprises heating at reaction temperatures, under conditions permitting the escape of volatile reaction products, in the presence of an esterification catalyst, a dihydric organic compound of the formula HO—R''—OH and approximately equimolecular proportions of a dihydrocarbon silicon compound of the formula

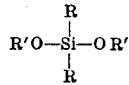

in which R and R' are hydrocarbon radicals, and R'' is a bivalent organic radical connected to two hydroxyl groups, said hydroxyl groups being directly connected to carbon atoms of the bivalent organic radical, and continuing such heating until substantially no more volatile product is formed.

9. A linear polysilicon ester having recurring structural units of the general formula—

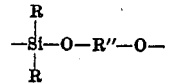

where R'' is divalent hydrocarbon radical, and R is a monovalent hydrocarbon radical.

10. A process for the production of linear polysilicon esters having recurring structural units of the general formula

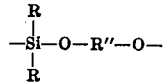

which comprises heating a glycol and a dihydrocarbon silicon compound of the formula

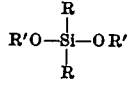

in which R, R' and R'' are hydrocarbon radicals, in approximate equimolecular proportions, at ester-forming temperatures, in the presence of a small amount of sodium as a catalyst, removing volatile reaction products, and continuing such heating until a resinous mass is obtained.

11. The process of claim 10 in which the said dihydric compound is dihpenylolpropane.

12. In the manufacture of polymeric materials, the step which comprises heating at reaction temperatures a dihydric organic compound of the formula HO—R''—OH with approximately chemically equivalent amounts of a dihydrocarbon silicon compound of the formula

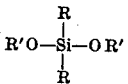

in which R and R' are hydrocarbon radicals, and R'' is a bivalent organic radical connected to two hydroxyl groups, said hydroxyl groups being directly connected to carbon atoms of the bivalent organic radical.

WILLIAM E. HANFORD.